US009832182B2

(12) United States Patent
Rouchouze et al.

(10) Patent No.: US 9,832,182 B2
(45) Date of Patent: Nov. 28, 2017

(54) METHOD FOR SECURING AN ELECTRONIC DOCUMENT

(71) Applicant: GEMALTO SA, Meudon (FR)

(72) Inventors: Bruno Rouchouze, Meudon (FR); Claude Barral, Meudon (FR); Michael Guerassimo, Meudon (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/365,588

(22) PCT Filed: Dec. 13, 2012

(86) PCT No.: PCT/EP2012/075403
§ 371 (c)(1),
(2) Date: Jun. 13, 2014

(87) PCT Pub. No.: WO2013/087778
PCT Pub. Date: Jun. 20, 2013

(65) Prior Publication Data

US 2014/0331302 A1 Nov. 6, 2014

(30) Foreign Application Priority Data

Dec. 14, 2011 (EP) .................................... 11306659

(51) Int. Cl.

*G06F 7/04* (2006.01)
*H04L 29/06* (2006.01)
*G07D 7/004* (2016.01)
*G07D 7/01* (2016.01)

(52) U.S. Cl.

CPC ......... *H04L 63/0807* (2013.01); *G07D 7/004* (2013.01); *G07D 7/01* (2017.05)

(58) Field of Classification Search

CPC ................................ G06F 21/34; G06F 21/35
USPC ..................................................... 726/26–30
See application file for complete search history.

(56) References Cited

U.S. PATENT DOCUMENTS 5,434,917 A 7/1995 Naccache et al.
6,888,442 B1 5/2005 O'Reilly et al.
7,188,258 B1 3/2007 Aggarwar et al.
(Continued)

OTHER PUBLICATIONS

Vivekraja et al., "Circuit-level techniques for reliable Physically Uncloneable Functions," 2009 IEEE International Workshop on Hardware-Oriented Security and Trust Year: 2009 pp. 30-35.*
(Continued)

*Primary Examiner* — Roderick Tolentino
(74) *Attorney, Agent, or Firm* — The Jansson Firm; Pehr B. Jansson

(57) ABSTRACT

The object of this invention is a method for securing an electronic document. In particular, this invention relates to a method that prevents the forging of documents in which an electronic chip is incorporated. To that end, the invention proposes a method in which the data on the document medium are associated with a fingerprint of the document, so as to make them inseparable. That fingerprint is determined on the basis of measurable physical units of the electronic chip or the medium. Thus, the invention allows the combination of the physical protection of the document and the protection of the chip so as to reinforce the security of said documents.

17 Claims, 2 Drawing Sheets

(56) References Cited

U.S. PATENT DOCUMENTS

| | | | | | |
|---|---|---|---|---|---|
| 2002/0194476 | A1* | 12/2002 | Lewis | G06F 21/10 | 713/168 |
| 2005/0167484 | A1* | 8/2005 | Sussman | G06Q 20/341 | 235/380 |
| 2007/0226507 | A1* | 9/2007 | Schilling | G06F 21/645 | 713/176 |
| 2009/0175491 | A1* | 7/2009 | Charpentier | G06K 9/00885 | 382/100 |
| 2010/0293384 | A1* | 11/2010 | Potkonjak | H04L 9/3247 | 713/176 |
| 2011/0002461 | A1* | 1/2011 | Erhart | H04L 9/302 | 380/44 |
| 2011/0069528 | A1* | 3/2011 | Gammel | G11C 13/0004 | 365/148 |
| 2011/0099117 | A1* | 4/2011 | Schepers | G06F 21/305 | 705/318 |
| 2013/0051552 | A1* | 2/2013 | Handschuh | G06F 21/602 | 380/44 |
| 2013/0202107 | A1* | 8/2013 | Danger | G01R 31/31719 | 380/44 |

OTHER PUBLICATIONS

Mubarak et al., "A critical review on RFID system towards security, trust, and privacy (STP)," 2011 IEEE 7th International Colloquium on Signal Processing and its Applications Year: 2011 pp. 39-44.*

Edward Sung., et al: "Physical Unclonable Functions for Device Authentication and Secret key Generation", 2007 44th ACM/IEEE Design Automation Conference: San Dieg, CA, June 4-8, 2007, IEEE, Piscataway, NJ, Jun. 1, 2007, pp. 9-14, XP031183294, ISBN: 978-1-59593-627-1.

PCT/EP2012/075403, International Search Report, European Patent Office, P.B. 5818 Patentlaan 2 NL—2280 HV Rijswijk.

* cited by examiner

METHOD FOR SECURING AN ELECTRONIC DOCUMENT

FIELD OF THE INVENTION

The object of this invention is a method for securing an electronic document. In particular, this invention relates to a method that prevents the forging of documents in which an electronic chip is incorporated. The invention also relates to a system that implements such an anti-forging method.

One of the aims of this invention is to protect a document comprising an electronic chip from forgery attempts. This invention also aims at ensuring the integrity of such documents (that is their non-alteration and non-modification).

BACKGROUND OF THE INVENTION

In order to reduce the forgery rate of certain documents, particularly official documents such as passports or identification cards, electronic chips are incorporated into such documents. The incorporation of such electronic chips enables to strengthen the integrity of such documents. At the present time, many means are known for securing a smart card against copying or forgery, particularly by inserting a hologram onto a surface of the document. However, forgers are increasingly capable of reproducing such means. It is also known, smart cards comprising memory wherein biometric identification data of their holders are stored. For example, such biometric data may represent the face, the hand or the fingerprint of the card holder. However, even though forgers are unable to identify the algorithms used by the smart card, they are now capable of copying the smart card itself, and its content, onto another document.

As a result, guaranteeing the integrity and authenticity of a document comprising an electronic chip continues to be a challenge. Today, security measures increasingly combine different technologies to protect such documents from new and ever more complex attacks.

One of the aims of the invention is to remedy the problems, drawbacks or deficiencies of the state of the art and/or to make improvements to it.

SUMMARY OF THE INVENTION

The invention is precisely aimed at addressing that need. To that end, the invention proposes a method for securing an electronic document so as to make the forging of such documents virtually impossible. That is why the invention proposes a method in which the physical protection of the document and the protection of the chip are combined so as to reinforce the security of said documents.

For that purpose, the invention proposes a method in which the data on the document medium are associated with a fingerprint of the document, so as to make them inseparable. That fingerprint is determined on the basis of measurable quantity of the electronic chip or the medium.

The invention is aimed at ensuring that the electronic component and its data are used on the proper document medium, and that a component of the document is not retrieved to generate a new counterfeit document.

One object of the invention is a method for securing an electronic document in which an electronic chip is incorporated in a medium of said document, wherein said method comprises the following steps:

determination of a fingerprint of the document depending on a measurement of a physical unit of the electronic chip or the medium of said document, signature of at least one control data which is on the medium or stored in the chip with the fingerprint of the document, storage of that signature in a verification server to be used in a subsequent step of verification of the authenticity of the medium and the chip of the document.

Another object of the invention is a system for securing an electronic document comprising a trusted verification server placed between an electronic document in which an electronic chip is incorporated in its medium and a control terminal, wherein said system comprises means capable of executing the securing method in the invention.

BRIEF DESCRIPTION OF DRAWINGS

The invention will become easier to understand in the description below and the figures accompanying it. The figures are presented for information and are not limitative in any way.

DETAILED DESCRIPTION OF THE EMBODIMENTS OF THE INVENTION

This invention will now be described in detail by reference to a few preferred embodiments, as illustrated in the attached drawings. In the description below, numerous specific details are provided in order to allow an in-depth understanding of this invention. However, it will be clear to a person of the art that this invention can be applied without all or part of these specific details.

In order to not make the description of this invention unnecessarily obscure, well-known structures, devices or algorithms have not been described in detail.

It must be remembered that in the description, when an action is allocated to a program or a device comprising a microprocessor, that action is executed by the microprocessor commanded by instruction codes stored in a memory of that device.

Figure 1:
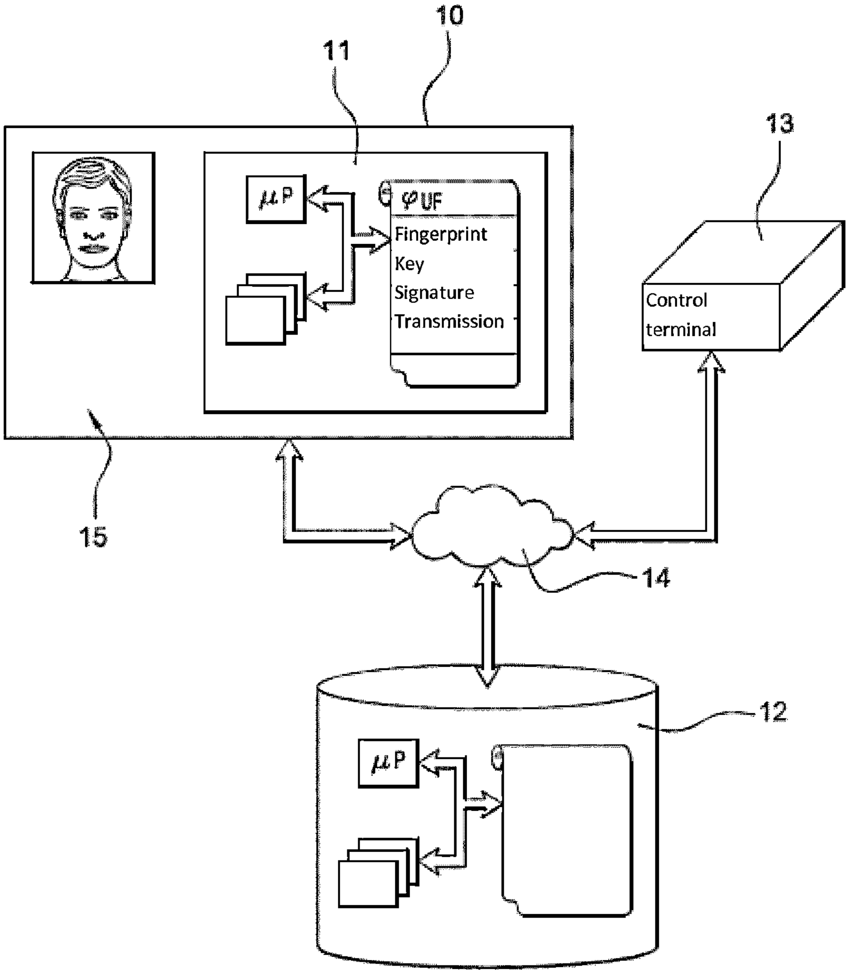
FIG. 1 is a schematic representation of an architecture mode of a system designed to secure a document incorporating an electronic chip.

FIG. 1 shows all the schematically necessary means for carrying out the method for securing a document 10 incorporating an electronic chip 11.

In this invention, the word "document" refers to all types of document incorporating an electronic chip and information, particularly bearing data to be read such as variable details (surname, given name, address, photograph etc. of a holder or parties to an agreement) and/or common details (security patterns, matrices, frames, field names, security seals, holograms etc.) Such a document may, particularly and for instance, be a passport, visa, identification card, driving licence, bank card, access control card, badge, RFID tag, legal document, agreement or any item.

The electronic chip 11 of the document 10 is an electronic component of the integrated microcircuit type. In one embodiment, the chip 11 is adapted for contactless communication technology, such as that described in the standard ISO 14443. In another embodiment, the chip 11 is adapted for contact type communication technology, such as that described in the standard ISO 7816. In another embodiment, the chip 11 may be a hybrid integrated microcircuit allowing both contact type reading and contactless reading. Such electronic chips are relatively well known in the state of the art and do not require a detailed description.

The electronic chip 11 comprises a memory wherein control data are stored. These control data allows to verify the identity of the entity to which the document 10 is intended to be allocated. These control data may for example comprise the surname, given name, date of birth, biometric fingerprints of one or several fingers or the eye, or a photograph of the face or head. For an animal, the control data could include its date of birth and breed. The control data are encoded by conventional means in order to make them difficult to access by unauthorised means.

In an enrolment/personalisation phase, the document 10 communicates with a trusted server 12 thanks to the electronic chip 11. In one embodiment, such communication may take place through a secure wired or radio communication network 14. In another embodiment, the server 12 comprises contactless or contact type interface circuits that allow contactless or contact type communication respectively with the electronic chip 11. The server 12 is capable of activating and authenticating the chip 11, reading the data contained in the chip 11, receiving those data and if necessary, modifying them or even deleting them in part or in full.

During a control phase, the document 10 is capable of communicating with a control terminal 13 with the help of an electronic chip 11. That control terminal 13 may be any device that is able to communicate with the electronic chip 11, activate it, authenticate it, read data contained in it and/or receive such data. The control terminal may operate remotely or require contact with the chip 11.

The control terminal 13 communicates with the trusted server 12 through a wired or radio communication network 14, preferably secure.

In this context, the term "control" means an operation involving the authentication and identification of the document 10 and the electronic chip 11. In general, control of a document 10 is any operation that allows a control entity to verify that the document has not been modified or altered and that the electronic chip 11 has not been forged.

The securing method in the invention is reinforced by the presence of a physically unclonable function (PUF). That function can be integrated in the electronic chip 11, and in the terminal 13 in some embodiments.

In the description below, only the steps that are most directly relevant to the invention are represented.

Figure 2:
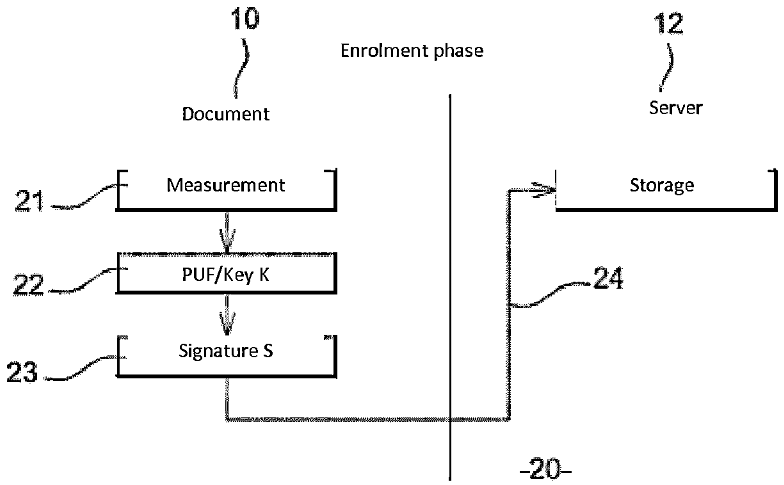
FIG. 2 is an illustration of the steps of an operating mode of a phase during which the document is enrolled with a remote server.

FIG. 2 shows an example of the enrolment phase 20 of the document 10 with the server 12. Such enrolment phase 20 is implemented when the document 10 is designed. In a preferred embodiment, that step is executed during the personalization step of the chip 11.

FIG. 2 shows a preliminary step 21 in which a measurement of a measureable physical unit of the document 10 is performed. In one embodiment, that measurement may be performed with a measurement module of an equipment of the manufacturing or personalising machine. In another embodiment, the measurement module is incorporated into the chip 11.

The measured physical unit is a value which is an attribute of a phenomenon or a body that can be identified qualitatively and determined quantitatively. It may relate to physical unit of the electronic component such as in particular the physical unit of the silicon or the variations of the manufacturing process of the electronic chip 11. The measured value may also relate to physical unit of the antenna if in contactless mode. It may also relate to physical unit of the medium 15 of the document 10, which may be made of paper, polycarbonate etc. It may also relate to physical unit of the printing ink of the document 10. The list is of course not exhaustive.

In the description, the working of the PUF function and the measurement modules is not detailed, as it is relatively well known to the person of the art.

In a step 22, a secret key K is generated on the basis of the PUF function and the measurement obtained in step 21. That key K may be determined using the following equation; K=f(c); where f is a PUF function; and where c is the measurement of the physical unit. The secret key supplied as the output of the PUF function is a fingerprint of the document 10. That fingerprint intrinsically characterises the document 10 uniquely. As it is virtually impossible to model, copy or control the variations of the manufacturing process of an integrated circuit or a medium 15 of said document, PUFs make these components or media not only unique, but also unclonable because such a PUF function supplies the same result value for the same input value. Thus they provide a secure and rugged mechanism for a low cost.

The step 22 securely provides a cryptographic key from a PUF of the electronic chip 11 or the medium of the document 10. The step 22 can be performed by the electronic chip 11 or by an external piece of equipment.

In a step 23, at least one control data of the document 10 is signed with the secret key K. That signature is then transmitted to the server 12 in the aim for storing it for a subsequent control phase. That signature is used in order to put in place a mechanism for authenticating the document 10.

The control data may be images, data and/or drawings present on the document 10. They may among others include a surname, given name, address, photograph, security pattern, security seal, hologram, biometric prints etc. The type and number of control data to sign in step 23 may be defined by default by an administrator of the server 12 or randomly.

In one embodiment, the administrator of the server or the server 12 first defines the value or values of the chip 11 or the document medium 10 to be measured for generating the keys. They also define the type and number of control data to sign. In one embodiment, the control data are signed with each of the secret keys K generated. In another embodiment, each control data may be signed with a secret key K that is specific to it. The different encrypted control data are classified and stored in a database of the server 12. The trusted server 12 is generally managed by the issuer of the document 10. It may for example be a state server.

Figure 3:
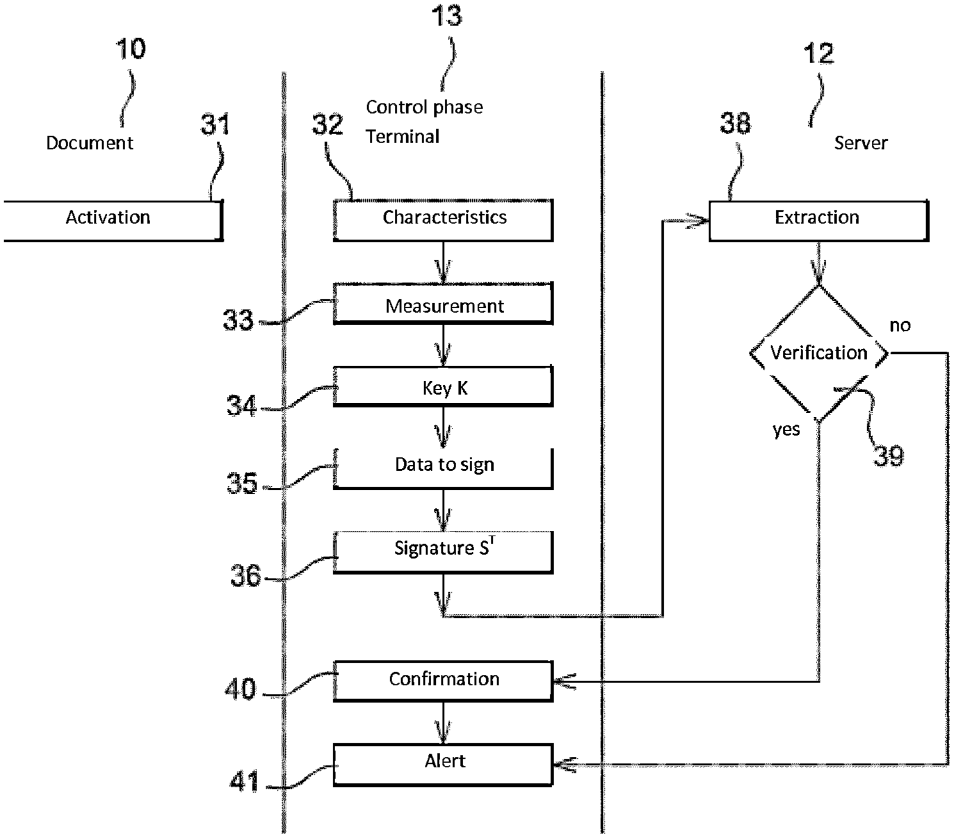
FIG. 3 shows an illustration of the stages of an operating mode of the method in the invention.

FIG. 3 is an embodiment of a control phase 30 or a verification step of the document 10. That control phase is preferably carried out in 0 real time. During the control phase, the terminal 13 can access the database of the server 12 via secure communication using a wired or wireless network connection.

The control phase 30 comprises a preliminary phase 31 during which the electronic chip 11 is activated. When the chip 11 is of the contactless mode, a radio field emitted by the control terminal 13 activates said chip. When the chip is of the contact type, it is inserted in a card reader of the terminal 13 in order to activate it.

In a step 32, the terminal 13 collects the physical value(s) of the medium of the document 10 or of the chip 11 to be measured. In one embodiment, these values are defined by default when the terminal 13 is designed. In that case, the terminal 13 extracts the list of values to measure from its database. In one alternative, when the chip 11 is activated, the terminal 13 sends a request for the list of values to measure to the server 12. In response, the server 12 extracts a default list or prepares one randomly. The list is then transmitted to the terminal 13.

In a step 33, the terminal 13 carries out the corresponding measurements with the help of the measurement sensor of said terminal. In a step 34, the terminal activates the PUF function that generates the secret key K for each measured value.

In a step 35, the terminal 13 collects the number and type of data to sign. In one embodiment, that number and that type are defined by default when the terminal 13 is designed. In that case, the terminal 13 extracts the type and number of data to sign from its database. In one alternative, the terminal 13 sends a request to the server 12 in order to obtain the number and type of the data to sign. In response, the server 12 extracts a default list from its database or prepares one randomly. The list is then transmitted to the terminal 13. In a step 36, the terminal 13 signs each piece of data collected with the secret key K.

In another embodiment, the terminal 13 collects the number and the type of data to sign and the type of physical value to measure that is associated with each type of data. In that case, in step 36, the terminal 13 signs each piece of data collected with the associated secret key K.

In a step 37, the terminal 13 sends to the server 12 the signature computed for each piece of data. Upon receipt, the server 12 extracts the corresponding signature or signatures derived from enrolment from its database in a step 38. In a step 39, the server 12 compares the signature or signatures extracted with those received in step 37. If the signature(s) match, the server 12 prepares a message confirming the authenticity of the document 10 and the incorporated chip 11. The message is then sent to the terminal 13 in a step 40. If any one of the signatures does not match, the server 12 prepares an alert message and transmits it to the terminal 13 in a step 41.

In another embodiment, the steps 32 to 36 may be performed by the chip. In that case, the chip can securely access the database of the terminal 13 and the server 12 via the terminal 13. Similarly, the verification step 39 may be executed by the terminal 13 or the chip 11.

In general, the verification of the authenticity of the document 10 will thus necessitate the preliminary creation of a reference table in the server 12 associated with an identification/serial number of the document 10 and containing the signatures matching a series of challenges drawn randomly or defined by default. One of the challenges here relates to the data to sign and the value to measure in order to generate the secret key. That step is preferably initiated before the document is put into circulation. Authenticity is subsequently verified by submitting one of the challenges attached to that document 10 after the identification/serial number is read and by checking that the document 10 supplies the expected reply.

In one example of implementation of the method in the invention, the document 10 is a passport with a contactless electronic chip. In this example, at the time of design, the server 12 randomly selects four physical units of the passport to measure out of a predefined number of physical unitsg. These four physical units relate to the antenna, the passport cover, a page of the passport and the silicon layer of the chip 11. A secret key is generated using the PUF function and the corresponding measurement for each value of physical unit is selected. The server 12 randomly selects four control data for the passport out of a predefined number of control data. These four control data are a biometric fingerprint stored in the chip, a surname and given name stated on a page of the passport and a hologram on the passport cover. The server also defines which type of value of physical unit to measure is associated with which type of control data, so that each control data is signed with a key specific to it.

In this implementation, the biometric fingerprint is signed with the secret key generated thank to the measurement of the value of the physical unit of the antenna. The surname is signed with the secret key generated thank to the measurement of the value of the physical unit of the silicon layer of the chip. The given name is signed with the secret key generated thank to the measurement of the value of the physical unit of the passport cover. The hologram is signed with the secret key generated with the measurement of the value of the physical unit of a passport page. The signatures are then classified and stored in the database of the server.

When the passport is being controlled by an immigration officer, a challenge/response authentication mechanism can be triggered. In that case, the immigration control terminal sends the server a request for authenticating the passport. In response, the server supplies a message requesting a signature containing the type of control data to sign and the associated value of physical unit to measure. In that example, the message may be "biometric fingerprint, antenna". Upon receipt, a PUF secret key is generated according to the measurement of the value of the physical unit of the antenna. The biometric fingerprint extracted from the chip is then signed with that secret key. That signature is then transmitted to the server for verification.

If the two signatures match, the server can send another message asking for a signature containing another type of control data to sign and the associated value of physical unit to measure. And so on, till the predefined number of challenges/responses is reached. It may be envisaged that the number of challenges is one. It may also be envisaged that by default, for all passports, the data to control are the surname, given name and date of birth stated on the medium of said passport and that these data are signed with the same key generated on the basis of a measurement of the value of the physical unit of the silicon layer of the chip.

The invention is not limited to the embodiments described above. It may also be implemented in other embodiments with an essential value which is to associate the data stated on the medium of the document or stored in the chip of the document with physical unit of said medium or chip.

The invention claimed is:

1. A method for securing an electronic document in which an electronic chip is incorporated in a medium of said document, wherein said method comprises the following steps:

enrollment of the electronic document by:

association of a plurality of measurable physical characteristics of the electronic chip or the medium of the electronic document with the electronic document;

determination of a value for each said measurable physical characteristic;

generation of at least one secret key K on the basis of the following equation: K=f(c) where f is a physically unclonable function (PUF) and c is the measured value for at least one of said measurable physical characteristics;

determination of a signature of a plurality of control data using said at least one secret key K thereby producing a plurality of associations of measurable physical characteristics and control data, and storage of the signature of each of said plurality of control data as verification signatures associated with said electronic document in a verification server to be used in a subsequent step during a verification step of the authenticity of the medium and the chip of the electronic document; and the verification step comprises the following steps:

activation of the electronic chip of the document by a control terminal placed between said document and the verification server;

determination of at least one measurable physical characteristic of the electronic chip or the medium of the electronic document selected from said plurality of measurable physical characteristics associated with said electronic document;

determination of a value for said measurable physical characteristic;

generation of a secret key K' on the basis of the following equation: K'=f(c) where f is a physically unclonable function (PUF) and c is the measured value for said measurable physical characteristic;

selecting a control data for which a verification signature obtained by signing with a secret key K exists in the storage of the verification server;

signing the selected control data using said generated secret key K';

comparison of the signed control data with the verification signature stored in the server;

if the two signatures match, the document is considered to be authentic;

if they do not match, the medium or the electronic chip are considered to be altered or modified.

2. The method according to claim 1, wherein the measurable value is a physical characteristic:

of the silicon layer of the chip or variations of the manufacturing process of said chip, of an antenna of the chip of the medium of the document, or of a printing ink of the document.

3. The method according to claim 1, wherein the type and number of values of physical unit to measure are defined by default or randomly.

4. The method according to claim 1, wherein a control data is:

a piece of data stated on the medium of the document such as a surname, date of birth, given name, address, photograph, security pattern, security seal or hologram, or a piece of data stored in a memory of the electronic chip such as a biometric print, surname, given name, date of birth, address or photograph.

5. The method according to claim 1, wherein the type and number of control data to sign are defined by default or randomly.

6. The method according to claim 1, wherein each control data is associated with a unique measureable physical unit, each control data being thus signed with a key that is specific to the control data.

7. The method according to claim 1, wherein the verification step comprises a challenge and response mechanism wherein the server sends a challenge based on a physical unit to measure and in response, receives from the control terminal or the chip a signature with a key generated on the basis of the challenge.

8. The method according to claim 1, wherein the medium is paper or polycarbonate.

9. The method according to claim 1, wherein the electronic chip of the document is a contact type or contactless chip.

10. A system for securing an electronic document having an electronic chip incorporated in a medium, the system comprising:

a trusted verification server;

a measurement module operable to secure the electronic document by:

association of a plurality of measurable physical characteristics of the electronic chip or the medium of the document with the electronic document;

measurement of said plurality of measurable characteristics;

generation of at least one secret key K on the basis of the following equation: K=f(c) where f is the PUF function and c is the measurement of the physical characteristics;

signing a plurality of control data, each of which is on the medium or stored in the chip, with said at least one secret key K thereby producing a plurality of verification signatures of control data associated with said electronic document; and transmission of the verification signatures of the control data to the verification server;

the verification server operable to store the verification signatures to be used in a subsequent step during a verification step of the authenticity of the medium and the chip of the document; and a control terminal placed between the electronic document and the verification terminal, the control terminal operable to activate the electronic chip of the document determination of at least one measurable characteristic of the physical unit of the electronic chip or the medium of the document selected from said plurality of measurable physical characteristics associated with said electronic document, operable to measure said selected characteristic, operable to generate a secret key K' on the basis of the following equation: K'=f(c) where f is the PUF function and c is the measurement of for said measurable physical characteristic;

operable to select a control data for which a verification signature obtained by signing with a secret key K exists in the storage of the verification server;

operable to sign the selected control data, which is on the medium or stored in the chip, with the secret key K';

comparison of the signed control data with the verification signature stored in the server;

if the two signatures match, the document is considered to be authentic; if they do not match, the medium or the electronic chip are considered to be altered or modified.

11. The system for securing an electronic document of claim 10, wherein the measurable value is a physical characteristic:

of the silicon layer of the chip or variations of the manufacturing process of said chip, of an antenna of the chip of the medium of the document, or of a printing ink of the document.

12. The system for securing an electronic document of claim 10 wherein the type and number of values of physical unit to measure are defined by default or randomly.

13. The system for securing an electronic document of claim 10 wherein a control data is:

a piece of data stated on the medium of the document such as a surname, date of birth, given name, address, photograph, security pattern, security seal or hologram, or a piece of data stored in a memory of the electronic chip such as a biometric print, surname, given name, date of birth, address or photograph.

14. The system for securing an electronic document of claim 10 wherein the type and number of control data to sign are defined by default or randomly.

15. The system for securing an electronic document of claim 10 wherein each control data is associated with a unique measureable physical unit, each control data being thus signed with a key that is specific to the control data.

16. The system for securing an electronic document of claim 10 wherein the medium is paper or polycarbonate.

17. The system for securing an electronic document of claim 10, wherein the electronic chip of the document is a contact type or contactless chip.

* * * * *